United States Patent

McKinney

[15] 3,701,154
[45] Oct. 24, 1972

[54] MATCHED FILTER
[72] Inventor: Edward J. McKinney, Arlington, Va.
[73] Assignee: The United States of America as represented by the Secretary of the Navy
[22] Filed: March 9, 1971
[21] Appl. No.: 122,403

[52] U.S. Cl..............343/18 E, 340/3 R, 343/17.2 R, 343/17.2 PC
[51] Int. Cl. ............................G01s 7/36, G01s 9/23
[58] Field of Search.........343/17.2 R, 17.2 PC, 18 E; 340/3 M

[56] References Cited

UNITED STATES PATENTS 3,112,452 11/1963 Kirkpatrick.........340/3 R UX
3,302,162 1/1967 Rowlands..................340/3 R Primary Examiner—T. H. Tubbesing
Attorney—R. S. Sciascia and H. H. Losche

[57] ABSTRACT

A matched filter having a frequency band signal input which is coupled through a wide band filter, through a plurality of narrow band filters coextensive in frequency with the wide band filter to phase code and decode the signal, through a similar number of hard limiters or comparators to an adder, and through a band pass filter, all between transmit-receive (T-R) switches of an electromagnetic echo ranging target detection system to detect targets in noise interference and countermeasure environments.

3 Claims, 2 Drawing Figures

MATCHED FILTER

BACKGROUND OF THE INVENTION

This invention relates to matched filter techniques and more particularly to matched filters used in the transmitter and receiver circuits of an echo ranging system with phase shifting means to phase code and decode the transmitted and received frequency signals, respectively, and with limiting means to control the false alarm rate to detect real targets in a low signal-to-noise ratio environment and where countermeasures are received back to provide false ranges of the target.

In the prior art, in order to perform its basic task, an echo ranging system must detect the presence of a signal echo in the presence of background interference and properly identify the detected signal. Signal detection requires the system to recognize a small increase in the power received in the presence of a high level of background interference due to natural phenomena and to jamming type countermeasures (CM). In an automatic (unmanned) system, this requires pre-establishment of a threshold or set of thresholds which, when exceeded, indicate the presence of a signal. Due to the statistical nature of the interference, there will always be a finite probability that the interference alone will exceed the threshold requirements giving rise to a false alarm. The false alarm probability and the probability of detection of the signal are both dependent on the threshold settings and are thus, for a given system, completely interdependent. In general, threshold settings are determined by the maximum tolerable false alarm probability and the resulting probability of detection accepted as the best attainable performance for the given system.

In the presence of countermeasures, the background interference can have a wide variety of waveforms as well as a wide range of amplitude levels. A system with fixed thresholds will be unable to maintain the false alarm probability at the tolerable level unless some means is provided for normalizing the input interference to the level for which the thresholds were set. AGC circuitry has been proven inadequate for this purpose in the countermeasures environment where the interference may have a wide variety of spectral characteristics over a period of time.

A desirable system characteristic would be the maintenance of a constant false alarm rate (at the minimum tolerable level) for all interference waveforms at all amplitude levels. In general, this is not attainable. An acceptable system characteristic is the maintenance of a constant false alarm rate for all amplitude levels of a given interference waveform and a limited variation in false alarm rate for a wide variety of interference waveforms. When the false alarm rate for a wide variety of interference waveforms (at all anticipated amplitude levels) can be maintained between pre-established limits, the system will be said to exhibit controlled false alarm rate (CFAR).

Given a maximum false alarm probability which will be assumed to be controllable, the problem then becomes one of establishing and evaluating the best receiver configuration in the countermeasures environment. The best receiver is assumed to be the one which provides the highest probability of detection for a given signal-to-interference ratio. An alternate definition of the best receiver is that receiver which requires the lowest signal-to-interference ratio for a 50 percent probability of detection. If the receiver has CFAR capability, the two definitions are equivalent.

The simplest model, which has been extensively used in detection studies, considers an environment in which the target echo is received together with stationary additive Gaussian noise. Under these conditions, conventional normalization techniques, such as AGC, are effective in providing CFAR and the optimum detector is then a matched filter or one of its equivalents, such as an active correlator. When the interference is non-Gaussian and/or nonstationary, these techniques become vulnerable to increased false alarms. Interference wavefroms which are rapidly swept in frequency and narrow band (compared to the signal bandwidth) interference waveforms are particularly effective in causing increased false alarm rates in such systems. A simple limiting counter-countermeasure (CCM) technique has been developed which solved the normalization problem in the presence of swept and wide band interference waveforms. This technique does not provide any enhancement of the signal but is compatible with conventional matched filtering. The technique was susceptible to highly colored interference waveforms and, in particular, to CW interference waveforms. Depending on the relative frequencies and bandwidths of the signal and interference, this susceptibility is in the form of lowered detection probability and increased false alarm probability or a decrease in both the detection and false alarm probabilities.

A patent issued to G. M. Kirkpatrick, U.S. Pat. No. 3,112,452, discloses a CCM technique which provides CFAR capability in the presence of a wider variety of interference waveforms and, in particular, against high colored interference waveforms such as CW or pulses of continuous sine waves. The Kirkpatrick technique does not provide any signal enchancement but is compatible with pulse compression systems, and, in fact, has been successfully applies to a system employing a linear frequency modulated pulse (CHIRP). The present invention is an extension of the techniques disclosed in this patent which provides further signal enhancement without loss of CFAR capability and with some increase in CFAR performance possible by means of an adaptive feature of the invention.

SUMMARY OF THE INVENTION

In the present invention a CCM matched filter circuit is placed in the transmit receive (T-R) switch circuit of an echo ranging system, such as a radar or sonar system, so that the transmitted signals and the received signals pass through the same filter circuit. The input to the matched filter has a wide band filter to allow a predetermined bank of frequencies through and these frequencies are split into several channels by a plurality of narrow band filters. The output of each of the narrow band filters is passed through a phase shifter to phase code and decode the narrow bands of frequencies and then hard limited to establish thresholds of the signal to unify signal amplitudes. All of the channeled frequencies are summed or added and the output of the adder applied through a band pass filter of the same band as the wide band filter to the T-R switch. Transmitted signals are passed through a comparator or hard limiter and a gate to the transmitter antenna while the received signals are passed through a single linear matched filter to the point of use, such as a display device. The phase shifters in the matched filter circuit provide the means to phase code the transmitted signals which phase decode the received or echo signals in like manner. Accordingly, it is a general object of this invention to provide a CCM matched filter circuit capable of splitting a wide band frequency signal into a plurality of narrow band frequency signals, phase code and decode these narrow band signals, hard limit these signals, and sum the hard limited and coded signals to normalize the transmitted and received echo signals for higher resolution target detection without loss of CFAR capabilities.

BRIEF DESCRIPTION OF THE DRAWING

These and other objects, advantages, and features will become more apparent to those skilled in the art as a more detailed description proceeds when considered along with the accompanying drawing in which.

DESCRIPTION OF THE PREFERRED EMBODIMENT

Figure 1:
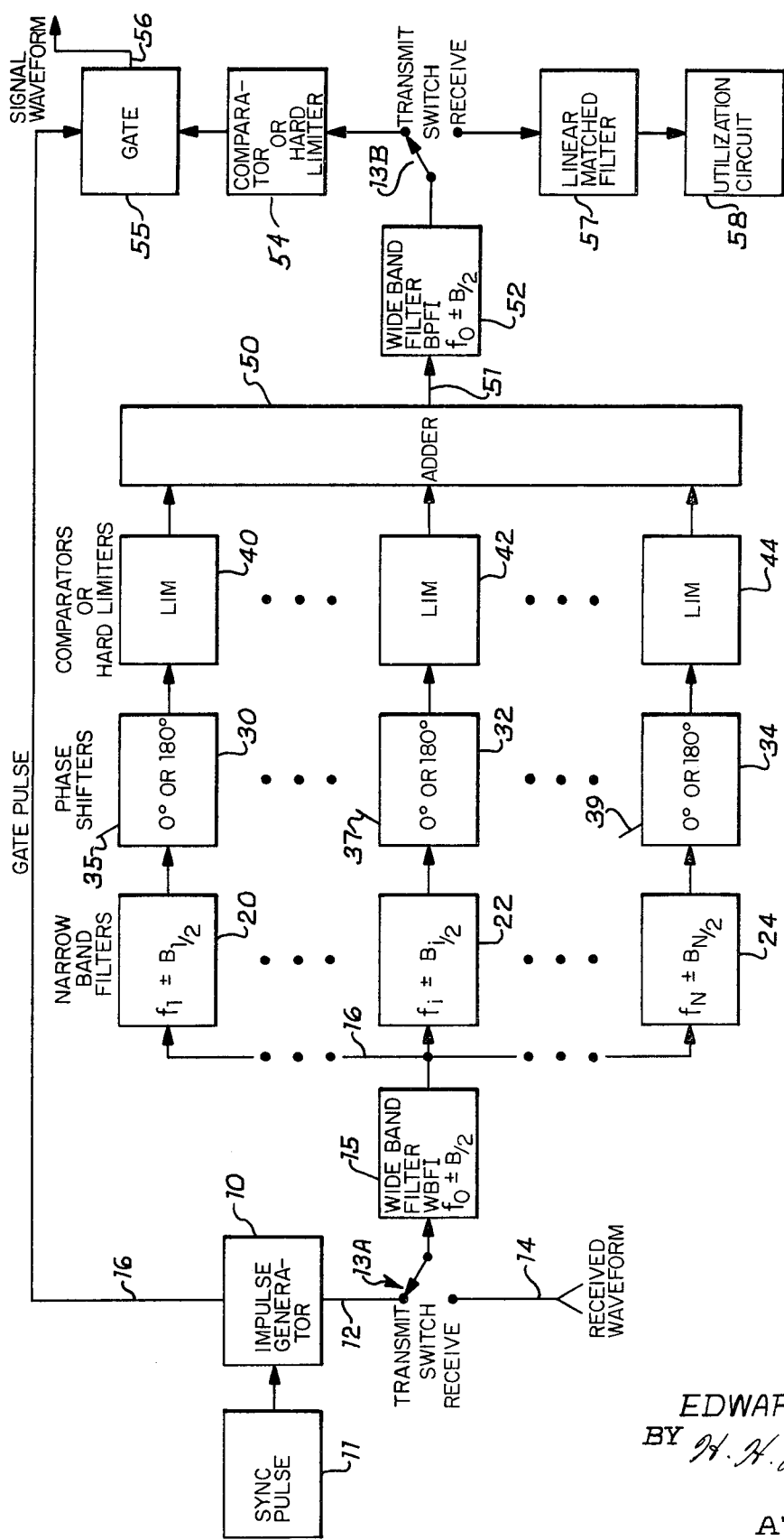
FIG. 1 is a block circuit schematic of the CCM matched filter of this invention.

Referring more particularly to FIG. 1 an impulse generator 10 triggered by sync pulses from a source 11 generates short pulses on the output 12, the time duration of which is short compared to the impulse response of a wide band filter (WBFI) to which these pulses are applied through a transmit-receive switch (T-R) switch 13A. The receiver terminal 14 of the T-R switch 13A is coupled to the output of a sensor (not shown) such as a sonar transducer or radar antenna. The output of the wide band filter 15 is approximately its impulse response and is a small central portion of the Sin X/X envelope which is fed simultaneously to a bank of narrow band filters 20–22–24, represented herein by frequencies $f_1 \pm B_{l/2}$, $f_i \pm B_{i/2}$, $f_N \pm B_{N/2}$ which represent a bank of narrow band filters of any desirable number between 20 and 22 and between 22 and 24. The total frequency span of these narrow band filters should span the band $B$ of the wide band filter 15 although they may not necessarily cover the band. That is, the narrow band filters 20–22–24 may be contiguous or have frequency gaps between adjacent filters. Noncontiguous narrow band filters are desirable in a sonar application to reduce the effects of reverberation. In any application the CCM matched filter theoretical performance improves as the number of narrow band filters is increased. In practice, a compromise will be required between the number of narrow band filters and the frequency gaps between filters based upon the maximum practical band width $B$ of the input wide band filter 15 and the minimum practical band width of the narrow band filters.

The outputs of the narrow band filters 20–22–24 are fed individually to a bank of two-state phase shifters 30–32–34 which provide either 0° phase shift or 180° of phase shift selected by the switch means 35, 37, and 39. Thus the phase shifters either pass the narrow band filter outputs unaltered (0° phase shift) or inverts their polarity by 180° phase shift. The purpose of these phase shifters 30–32–34 is to provide the system designer with a means of phase coding to adjust the system performance to the environment of the sonar or the radar system as most desirable.

The outputs of the bank of phase shifters 30–32–34 are fed individually to a bank of comparators or hard limiters 40–42–44. A comparator is a two state device whose output voltage is either plus or minus some value of voltage V depending on the polarity of the input waveform, as well understood by those skilled in the art. In theory the performance of a comparator and an ideal hard limiter are identical. Accordingly, the limiters 40–42–44 each limit the narrow band frequency in either its zero or 180° phase condition in their channels 20,30,40; 22,32,42; and 24,34,44 in their respective channel outputs.

The outputs of the comparator-limiter 40–42–44 are then summed in an adder circuit 50 of any well known construction and the sum produced on the output 51. Since the output of each limiter or comparator 40–42–44 is either plus or minus V, the output 51 voltage from the adder 50 is restricted to the range plus or minus NV where N is the number of narrow band channels. The output 51 of the adder 50 is passed through a band pass filter 52, the band width B of which is the same as the band width of the wide band filter 15. The output of the band pass filter 52 is applied to the second section 13B of the T-R switch and in its transmit switch position is passed through a comparator or hard limiter 54, thence through gate 55 to an output 56 which is adapted to be coupled to the transmitter antenna or transducer. The gate circuit 55 is gated by a gate pulse from the impulse generator 10 by way of a conductor means 16. The output of band pass filter 52 is hard limited in 54 to produce a waveform which varies in time between two voltage stated $V_1$ depending on the polarity of the waveform out of band pass filter 52. This two state waveform is time gated by the gate circuit 55 in accordance with the triggers applied thereto over the conductors 16 from input pulse generator 10. If the frequency separation between all adjacent channels is the same and the gate time duration set as an integral multiple of this frequency separation, the gated waveform is used directly as the transmitted waveform. Otherwise, the gated waveform, which may be digitally represented, is time reversed and the result used as the transmitted waveform.

The T-R switch 13A,13B switches alternately in unison after each transmitted pulse from the transmit position to the receive position electronically, as is well understood in the operation of sonar and radar ranging devices. In the receive positions of the T-R switch 13A,13B interference alone or signal plus interference is applied over the input conductor 14 to the T-R switch 13A which proceeds through the wide band filter 15 and on to the system of narrow band frequency channels in the same manner as impulses from the generator 10 in the transmit position. In the receive position of the T-R switch 13B the output of the band pass filter 52 is conducted through a linear matched filter 57 to a utilization circuit 58 illustrated herein by block which may be of any type such as a cathode ray tube indicator. Since the received signal is, by virtue of symmetry or reversal, a time reverse of the impulse response of the system, the system is matched to the signal waveform in the sense that its response to the signal exceeds its response to any other waveform. It is not a matched filter in a conventional sense of the word due to the nonlinearities on both transmit and receive functions. Since the narrow band filter channels do not overlap, the voltages V out of the channel limiters 40–42–44 are independent. Therefore, with interference only at the input to the system, the limiter voltages add noncoherently and the root mean square (RMS) noise power out of the adder 50 is proportional to $NV^2$ where N is the number of channels and V is the limiter output voltage level. If the input to the system consists of signal alone, the voltage output of the limiters 40–42–44 will add coherently and produce a peak power proportional to $(NV)^2$. Thus, the maximum attainable signal-to-interference ratio will be proportional to the number of channels N.

OPERATION

Figure 2:
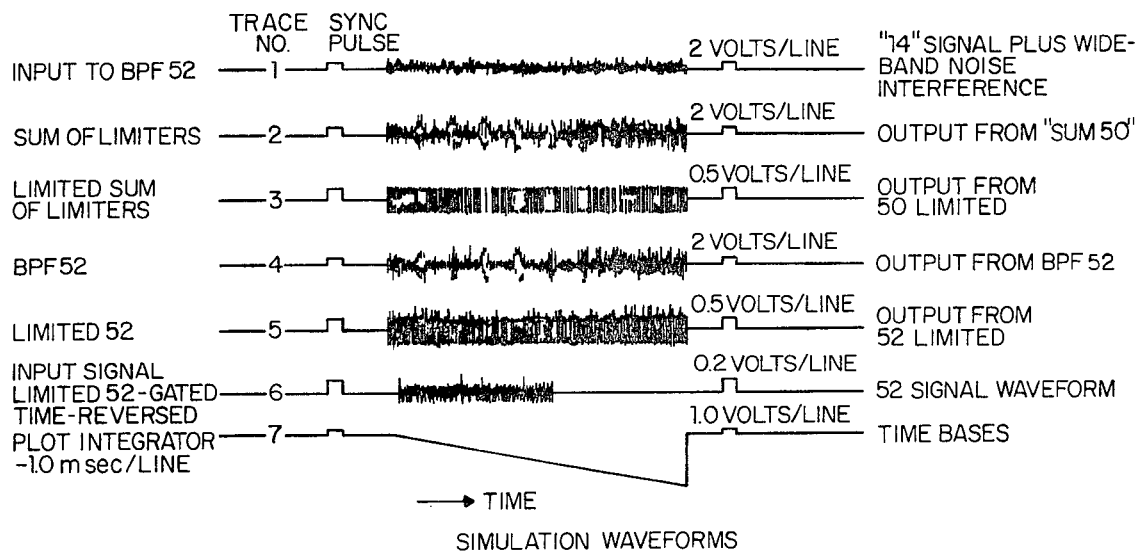
FIG. 2 provides traces of the waveforms appearing at various points in FIG. 1.

In the operation of the CCM matched filter illustrated in block in FIG. 1 with reference to the traces of FIG. 2, let it first be assumed that the T-R switches 13A,13B are in the transmit position as shown in FIG. 1. In this switched position a sync pulse will trigger the impulse generator 10 to start a time base running as illustrated in trace number 7 of FIG. 2 (not illustrative of any circuit results). The impulse generator 10 will produce a pulse of frequencies having an envelope of the center of Sin X/X which will be conducted through the wide band filter 15 and the several channels to the adder circuit 50. The output of the adder 50 would be the sum of the frequencies of the narrow band channel filters 20–22–24 plus higher order harmonics generated by the hard limiters 40–42–44. The output of band pass filter 52 would be hard limited, time reversed and transmitted by way of gate 55 with the waveform as shown in trace number 6. This waveform was obtained by recording the gate output and then reversing the tape developed therefrom to provide a transmit waveform. This transmitted impulse of frequency would be coded in accordance with the setting of the switches 35–37–39 in the phase shifters 30–32–34 in accordance with the desired phase coding for the environment in which the sonar or radar system is operating. This trace, trace number 6, with wide band noise added to simulate interference, echoed back and received via 14 produces the signal plus wide band noise interference as shown in trace number 1.

After transmission the T-R switches 13A,13B will be switched to the receive mode, as well understood by those skilled in the sonar and radar range art, to receive an echo signal of the transmitted signal as shown by trace 1 with wide band noise added to simulate interference. The received signal will be conducted through the wide band filter 15 and through the several filter channels to the adder circuit 50. Since the transmitted signal was coded, this reflected coded echo signal will be decoded by the phase shifts 30–32–34. The output of the adder circuit 50, as shown by trace 2, will be conducted through the wide band filter 52, as shown by trace 4, and through the linear matched filter 57 to the utilization circuit such as a cathode ray tube display to indicate whether the target object is real and not a target object caused by countermeasure. Additional traces in FIG. 2 which were made during simulation tests for information purposes which do not represent waveforms at any point in the circuit of FIG. 1 are trace number 3 which is the limited output of adder 50 in the receive mode and trace number 5 which is the limited output of wide band filter 52. The receive signals will be pulse compressed. Since interference signal powers will add noncoherently as $NV^2$ and target signal powers will add coherently by $(NV)^2$ a target signal will be very pronounced while interference or countermeasure signals will be suppressed in the signal-to-interference ratio proportional to the number N. The phase coding and decoding of the transmitted and received signals operate to provide the best CFAR performance to the environment anticipated. For this CCM matched filter there is no necessity to maintain a linear phase function over the entire frequency band B of the filter bank although it may be desirable to maintain linear phase over each individual channel. The functioning of the CCM matched filter herein described provides excellent signal-to-interference noise ration in adapting its interference performance to the anticipated environment and the subsequent definition and generation of a transmitted signal based on the anticipated environment by the selected coding of the phase shifter 30–32–34 to the 0° or 180° phase conditions by switches 35–37–39. In this way the environment establishes the parameters of the above-described CCM matched filter.

While many modifications may be made in the constructional details without departing from the preferred embodiment shown herein to acquire similar results and functions, I desire to be limited in the spirit of my invention only by the scope of the appended claims.

I claim:

1. A counter-countermeasure matched filter circuit comprising:

an input of frequency signals from a T-R switch coupled for alternate switching to a transmitter pulse generator and to a receiver output;

a wide band filter in said input to pass frequency signals in a predetermined band of frequencies to an output thereof;

a plurality of narrow band filters coupled in common to the wide band filter output and each having an output;

a two state phase shifter coupled to the output of each narrow band filter for selectively shifting the phase of each narrow band of frequency 0° and 180° on an output thereof providing phase coding and decoding of said wide band of frequencies;

a limiter coupled to the output of each narrow band filter to limit the amplitude of the narrow band frequency on an output thereof;

an adder network having inputs coupled to the outputs of said limiters to sum the narrow band frequency signals into a wide band of frequencies coextensive in bandwidth to said wide band filter on an output thereof, each circuited narrow band filter, phase shifter, hard limiter, and adder network providing narrow band filter channels; and a band pass filter coupled to the output of said adder circuit to filter out harmonics produced by the addition of said narrow bands of frequencies with an output coupled through said T-R switch to switch for transmission and reception, said switch for transmission being through a hard limiter and gate and said switch for reception being through a linear matched filter to a point of use whereby transmitted frequency signals are phase coded in said plurality of narrow band filters in a plurality of narrow frequency bands and the received echo signals are phase decoded in said plurality of narrow band filters to eliminate false alarms and countermeasure signals not conforming to the frequency coded signals.

2. A counter-countermeasure matched filter circuit as set forth in claim 1 wherein
said T-R switch in one switched condition couples said pulse generator output through said filter channels, through said hard limiter, and through said gate for phase coded transmission of pulses, and in the other switched condition couples the receiver through said filter channels for phase decoding the echo pulses and through the linear matched filter for target echo use.

3. A counter-countermeasure matched filter circuit as set forth in claim 2 wherein
said plurality of narrow band filters have separate adjacent narrow frequency bands within the frequency limits of said wide band filter, said narrow frequency bands ranging from contiguous to noncontiguous gaps in frequency therebetween to control the effects of reverberation.

* * * * *